(12) United States Patent
Nakatsugawa et al.

(10) Patent No.: US 7,899,767 B2
(45) Date of Patent: Mar. 1, 2011

(54) PROBABILISTIC MODEL GENERATION METHOD, APPARATUS, AND PROGRAM

(75) Inventors: Minoru Nakatsugawa, Kawasaki (JP); Takeichiro Nishikawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 680 days.

(21) Appl. No.: 11/496,718

(22) Filed: Aug. 1, 2006

(65) Prior Publication Data

US 2007/0038558 A1      Feb. 15, 2007

(30) Foreign Application Priority Data

Aug. 12, 2005   (JP) .............................. 2005-234813

(51) Int. Cl.
*G06F 15/18*      (2006.01)
*G06F 19/00*      (2006.01)
(52) U.S. Cl. .......................................... 706/45; 705/12
(58) Field of Classification Search .................... 706/15, 706/45, 52
See application file for complete search history.

(56) References Cited

U.S. PATENT DOCUMENTS

| | | | |
|---|---|---|---|
| 5,742,775 A | 4/1998 | King | |
| 5,905,814 A * | 5/1999 | Mochizuki et al. | 382/239 |
| 5,966,699 A | 10/1999 | Zandi | |
| 6,023,686 A | 2/2000 | Brown | |
| 6,098,051 A | 8/2000 | Lupien et al. | |
| 6,961,719 B1 * | 11/2005 | Rai | 706/21 |
| 7,509,282 B2 | 3/2009 | Shirkawa et al. | |
| 7,685,062 B2 * | 3/2010 | Gasparri | 705/38 |
| 2001/0020233 A1 * | 9/2001 | Shirakawa et al. | 705/37 |
| 2002/0116312 A1 | 8/2002 | Talbot et al. | |
| 2002/0120557 A1 | 8/2002 | Chien | |

(Continued)

FOREIGN PATENT DOCUMENTS

JP         10-222581         8/1998

(Continued)

OTHER PUBLICATIONS

MAP model matching Well, W.M., III Computer Vision and Pattern Recognition, 1991. Proceedings CVPR '91., IEEE Computer Society Conference on Jun. 3-6, 1991 pp. 486-492 Digital Object Identifier 10.1109/CVPR.1991.139740.*

(Continued)

*Primary Examiner*—Donald Sparks
*Assistant Examiner*—Ola Olude Afolabi
(74) *Attorney, Agent, or Firm*—Nixon & Vanderhye, PC

(57) ABSTRACT

There is provided with a method, including: optimizing a first objective function defined by using an explanatory variable belonging an attribute in each sample, a target variable in each sample, and a first conversion parameter to find a value of the first conversion parameter; generating by using the first conversion parameter corresponding to the attribute a conversion function for converting an explanatory variable belonging to the attribute to an intermediate variable with certain range; optimizing a second objective function defined by using a plurality of the intermediate variables corresponding to the plurality of variables in each sample, the target variable in each sample, and a second conversion parameter to find a value of the second conversion parameter; and generating by using the second conversion parameter a probabilistic model for calculating from a plurality of intermediate variables a probability that a predetermined event occurs or does not occur.

13 Claims, 11 Drawing Sheets

U.S. PATENT DOCUMENTS

| | | | |
|---|---|---|---|
| 2003/0101132 A1 | 5/2003 | Gaubatz et al. | |
| 2003/0149657 A1 | 8/2003 | Reynolds et al. | |
| 2004/0205019 A1 | 10/2004 | Painter et al. | |
| 2005/0065754 A1 | 3/2005 | Schaf et al. | |
| 2006/0116945 A1* | 6/2006 | Nishikawa | 705/35 |

FOREIGN PATENT DOCUMENTS

| | | |
|---|---|---|
| JP | 2000-259719 | 9/2000 |
| JP | 2001-338124 | 12/2001 |
| JP | 2004-005626 | 1/2004 |
| JP | 2004-185421 | 7/2004 |
| WO | 98/10361 | 3/1998 |

OTHER PUBLICATIONS

A neural net for reconstruction of multiple curves with a visual grammar Mjolsness, E.; Rangarajan, A.; Garrett, C. Neural Networks, 1991., IJCNN-91-Seattle International Joint Conference on vol. i, Jul. 8-14, 1991 pp. 615-620 vol. 1 Digital Object Identifier 10.1109/IJCNN.1991.155249.*

Strong-sense class-dependent features for statistical recognition Omar, M.K.; Hasegawa-Johnson, M.; Statistical Signal Processing, 2003 IEEE Workshop on Sep. 28-Oct. 1, 2003 pp. 490-493 Digital Object Identifier 10.1109/SSP.2003.1289454.*

Optimal response functions in a network of discretely firing neurons Luttrell, S.P.; Artificial Neural Networks, Fifth International Conference on (Conf. Publ. No. 440) Jul. 7-9, 1997 pp. 216-220.*

Edward I. Altman et. al, "Zeta Analysis: A new model to identify bankruptcy risk of corporations", Journal of Banking and Finance, 1, 1977, 29-54.*

U.S. Appl. No. 11/235,160, filed Sep. 27, 2005.

U.S. Appl. No. 09/773,913, filed Feb. 2, 2001.

Hiroaki Yamauchi; The Autumn Conference 2004 of the Operations Research Society of Japan; Tokyo Institute of Technology; Sep. 8, 2004.

Office Action in Japanese Patent Application No. 2005-234813, dated Jul. 3, 2009, and English-language translation.

* cited by examiner

| ENTERPRISE NUMBER | FINANCIAL INDEX 1 GROSS PROFIT RATIO ON SALES | FINANCIAL INDEX 2 OWNED CAPITAL RATIO | FINANCIAL INDEX 3 ORDINARY INCOME | FINANCIAL INDEX 4 ACCOUNTS RECEIVABLE COLLECTION PERIOD | FINANCIAL INDEX 5 SALES INCREASE RATIO |
|---|---|---|---|---|---|
| 1 | 91.296 | 24.830 | 4,500,000 | 2.411 | -0.829 |
| 2 | 25.116 | 46.520 | 535,630,000 | 1.734 | 8.660 |
| 3 | 19.555 | 0.350 | 33,460,000 | 3.577 | -32.213 |
| 4 | 32.442 | 36.606 | 96,430,000 | 4.349 | 2.982 |
| 5 | 3.491 | 62.584 | 67,560,000 | 3.257 | -8.294 |
| 6 | 21.455 | 63.399 | 30,460,000 | 1.946 | 13.021 |
| ... | ... | ... | ... | ... | ... |

FIG. 2

| ENTERPRISE NUMBER | FINANCIAL INDEX 1 (BEFORE CONVERSION) GROSS PROFIT RATIO ON SALES | FINANCIAL INDEX 1 (AFTER CONVERSION) GROSS PROFIT RATIO ON SALES |
|---|---|---|
| 1 | 91.296 | 0.000 |
| 2 | 25.116 | 0.197 |
| 3 | 19.555 | 0.663 |
| 4 | 32.442 | 0.016 |
| 5 | 3.491 | 0.999 |
| 6 | 21.455 | 0.491 |
| ⋮ | ⋮ | ⋮ |

FIG. 5

| ENTERPRISE NUMBER | BANKRUPTCY PROBABILITY |
|---|---|
| 1 | 0.025 |
| 2 | 0.019 |
| 3 | 0.756 |
| 4 | 0.022 |
| 5 | 0.841 |
| 6 | 0.312 |
| ⋮ | ⋮ |

FIG. 6

| ID | INDEX NAME |
|---|---|
| 1 | PART-TIMER RATIO |
| 2 | DISPATCHED MEMBER RATIO |
| 3 | RATIO OF BUSINESS EXPERIENCE OF YEAR OR LESS |
| 4 | OFFICE WORK MISTAKES (CASH HANDLING) PER OFFICE WORK AMOUNT |
| 5 | OFFICE WORK MISTAKES (SEAL DIFFERENCE) PER OFFICE WORK AMOUNT |
| 6 | OFFICE WORK MISTAKES (IMPORTANT ARTICLE LOSS) PER OFFICE WORK AMOUNT |
| 7 | LOSS ACCIDENTS PER OFFICE WORK AMOUNT |
| 8 | COMPLAINTS PRE OFFICE WORK AMOUNT |
| 9 | OFFICE WORK AMOUNT PER MEMBER |
| 10 | OVERTIME WORK RATIO |
| 11 | CANCELLATION RATIO |
| 12 | PURE DECREASE RATE OF ACCOUNT |
| 13 | OFFICE WORK AMOUNT PER ONE OCCURRENCE OF BUSINESS |
| 14 | OFFICE WORK AMOUNT RATIO OF EXECUTIVE |
| 15 | NUMBER OF MEMBERS OF STAFF |
| 16 | AVERAGE EDUCATION TIME |

FIG. 10

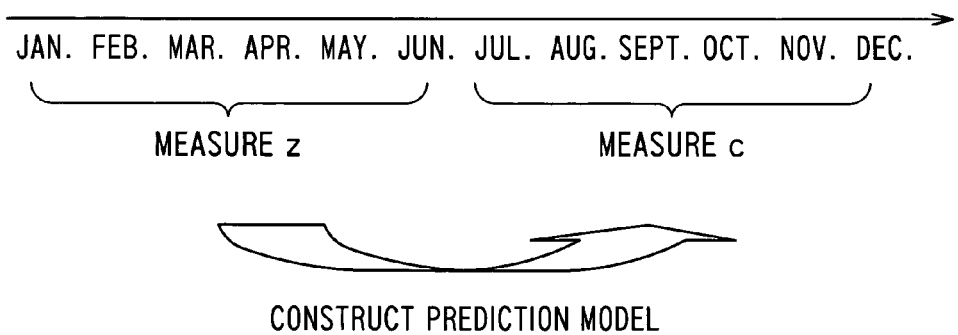

FIG. 11

| j | x | c |
|---|---|---|
| 1 | Za | 1 |
| 2 | Za | 1 |
| 3 | Za | 0 |
| ⋮ | ⋮ | ⋮ |
| 100 | Za | 0 |

FIG. 12

| j | x | c |
|---|---|---|
| 1 | Za | 1 |
| 2 | Za | 1 |
| 3 | Za | 0 |
| ⋮ | ⋮ | ⋮ |
| 1000 | Za | 0 |
| 1001 | Zb | 1 |
| ⋮ | ⋮ | ⋮ |
| 9503 | Zx | 1 |
| 9504 | Zx | 1 |
| 9505 | Zx | 1 |
| 9506 | Zx | 0 |
| ⋮ | ⋮ | ⋮ |
| 100000 | Zx | 0 |

FIG. 13

| ID | INDEX NAME |
|---|---|
| 1 | NUMBER OF TIMES OF BUSINESS INTERRUPT |
| 2 | NUMBER OF TIMES ORDER CHANGE PER NURSING PERSON |
| 3 | NUMBER OF BUSINESS EXPERIENCE MONTHS |
| 4 | NUMBER OF WORK PLACE EXPERIENCE MONTHS |
| 5 | NUMBER OF PATIENTS PER NURSING PERSON |
| 6 | NUMBER OF SERIOUS CASES PER NURSING PERSON |
| 7 | NUMBER OF SURGICAL OPERATIONS PER MEMBER OF STAFF |
| 8 | NUMBER OF TIMES OF HOSPITALIZATION AND LEAVING HOSPITAL PER NURSING PERSON |
| 9 | NUMBER OF MEDICINES TO BE HANDLED WITH CARE |
| 10 | OVERTIME WORK TIME |
| 11 | NUMBER OF COMPLAINTS FROM PATIENTS |
| 12 | NUMBER OF COMPLAINTS FROM PATIENT FAMILIES |
| 13 | HELPER RATIO |
| 14 | DAY OF THE WEEK |
| 15 | TIME CATEGORY |
| 16 | DIRECT BUSINESS RATIO |

FIG. 14

PROBABILISTIC MODEL GENERATION METHOD, APPARATUS, AND PROGRAM

CROSS-REFERENCE TO RELATED APPLICATIONS

This application is based upon and claims the benefit of priority from the prior Japanese Patent Applications No. 2005-234813 filed on Aug. 12, 2005, the entire contents of which are incorporated herein by reference.

BACKGROUND OF THE INVENTION

1. Field of the Invention

The present invention relates to a probabilistic model generation method, a probabilistic model generation apparatus, and a program.

2. Related Art

As for the credit risk model, it has become the mainstream to adopt a binary logit model supplied with financial indexes as inputs, from the viewpoint of precision and easiness of interpretation. A technique of calculating a bankruptcy probability of an enterprise by using a logit model is described in JP-A 2000-259729(KOKAI). It is necessary to set upper and lower limit values of financial indexes suitably in order to reduce the sense of incompatibility when an analyst actually utilizes the logit model.

It is effective in preventing the estimated bankruptcy probability from being changed greatly by outlier values to set upper and lower limit values for financial indexes. In determining upper and lower limit values for respective financial indexes, however, expert knowledge concerning financial statements and actual operation are requested.

SUMMARY OF THE INVENTION

According to an aspect of the present invention, there is provided with a probabilistic model generation method for generating a probabilistic model calculating a probability that a predetermined event occurs or does not occur, by using learning data as a set of samples each of which includes a plurality of explanatory variables belonging to respectively different attributes and a target variable representing whether the predetermined event occurs or not, comprising: optimizing a first objective function defined by using the explanatory variable belonging the attribute in each sample, the target variable in each sample, and a first conversion parameter to find a value of the first conversion parameter as for each of the attributes; generating by using the first conversion parameter corresponding to the attribute a conversion function for converting an explanatory variable belonging to the attribute to an intermediate variable with certain range of value as for each of the attributes; optimizing a second objective function defined by using a plurality of intermediate variables corresponding to the plurality of explanatory variables in each sample, the target variable in each sample, and a second conversion parameter to find a value of the second conversion parameter; and generating by using the second conversion parameter a probabilistic model for calculating from a plurality of intermediate variables a probability that the predetermined event occurs or does not occur.

According to an aspect of the present invention, there is provided with a probabilistic model generation method for generating a probabilistic model calculating a probability that a predetermined event occurs or does not occur, by using learning data as a set of samples each of which includes a plurality of explanatory variables belonging respectively different attributes and a target variable representing whether the predetermined event occurs or not, comprising: optimizing an objective function defined by using the plurality of variables in each sample, the target variable in each sample, a first conversion parameter provided for each of the attributes, and a second conversion parameter to find values of the first conversion parameters and a value of the second conversion parameter; generating by using the first conversion parameter corresponding to the attribute a conversion function for converting an explanatory variable belonging to the attribute to an intermediate variable with certain range of value, as for each of the attributes; and generating by using the second conversion parameter a probabilistic model for calculating from a plurality of intermediate variables a probability that the predetermined event occurs or does not occur.

According to an aspect of the present invention, there is provided with a probabilistic model generation apparatus, comprising: a database configured to store learning data as a set of samples each of which includes a plurality of explanatory variables belonging to respectively different attributes and a target variable representing whether the predetermined event occurs or not; a conversion function generator configured to optimize a first objective function defined by using the explanatory variable belonging the attribute in each sample, the target variable in each sample, and a first conversion parameter to find a value of the first conversion parameter as for each of the attributes and configured to generate by using the first conversion parameter corresponding to the attribute a conversion function for converting an explanatory variable belonging to the attribute to an intermediate variable with certain range of value as for each of the attributes; a model generator configured to optimize a second objective function defined by using a plurality of intermediate variables corresponding to the plurality of explanatory variables in each sample, the target variable in each sample, and a second conversion parameter to find a value of the second conversion parameter and configured to generate by using the second conversion parameter a probabilistic model for calculating from a plurality of intermediate variables a probability that the predetermined event occurs or does not occur.

According to an aspect of the present invention, there is provided with a program which is executed by a computer, comprising instructions for: accessing a database configured to store learning data as a set of samples each of which includes a plurality of explanatory variables belonging to respectively different attributes and a target variable representing whether the predetermined event occurs or not; optimizing a first objective function defined by using the explanatory variable belonging the attribute in each sample, the target variable in each sample, and a first conversion parameter to find a value of the first conversion parameter as for each of the attributes; generating by using the first conversion parameter corresponding to the attribute a conversion function for converting an explanatory variable belonging to the attribute to an intermediate variable with certain range of value as for each of the attributes; optimizing a second objective function defined by using a plurality of intermediate variables corresponding to the plurality of variables in each sample, the target variable in each sample, and a second conversion parameter to find a value of the second conversion parameter; and generating by using the second conversion parameter a probabilistic model for calculating from a plurality of intermediate variables a probability that the predetermined event occurs or does not occur.

BRIEF DESCRIPTION OF THE DRAWINGS

FIG. 2 is a diagram showing an example of financial index values;

FIG. 5 is a diagram showing financial index values before and after conversion;

FIG. 6 is a diagram showing a table which represents bankruptcy probabilities of enterprises;

FIG. 10 is a diagram showing an example of explanatory variables;

FIG. 11 is a diagram showing data used to generate a model to estimate a loss accident occurrence probability half a year hence;

FIG. 12 is a diagram showing a data example of a operation branch A;

FIG. 13 is a diagram showing a data example of all operation branches;

FIG. 14 is a diagram showing an example of explanatory variables; and

DETAILED DESCRIPTION OF THE INVENTION

First Embodiment

Figure 1:
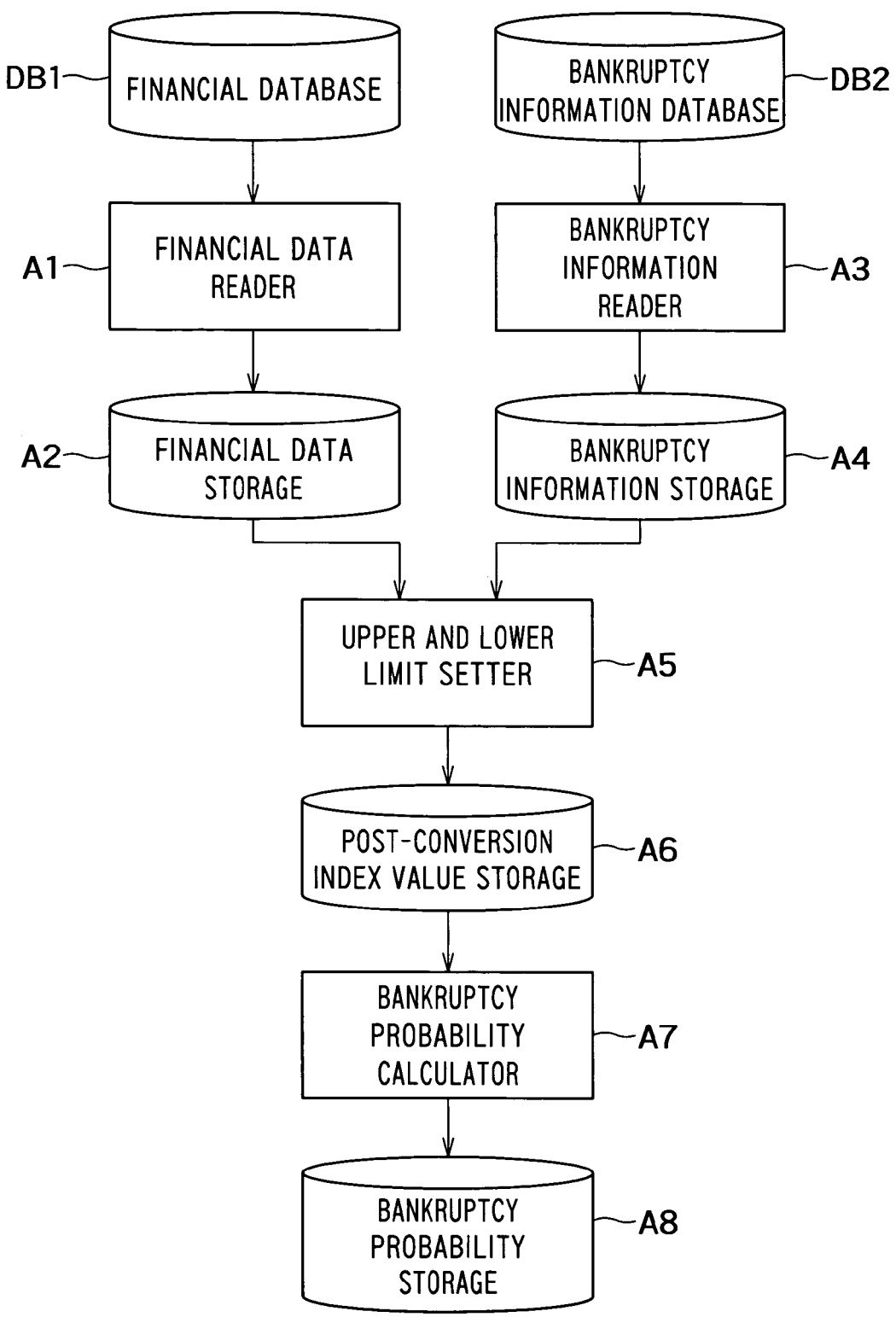
FIG. 1 is a block diagram showing schematically a probabilistic model generation apparatus according to a first embodiment.

FIG. 1 is a block diagram showing schematically a probabilistic model generation apparatus according to a first embodiment of the present invention.

The probabilistic model generation apparatus includes a financial database DB1, a bankruptcy information database DB2, a financial data reader A1, a financial data storage A2, a bankruptcy information reader A3, a bankruptcy information storage A4, a financial index value upper and lower limit setter A5 (hereinafter simply, referred to as upper and lower limit setter), a post-conversion index value storage A6, a bankruptcy probability calculator A7, and a bankruptcy probability storage A8. The upper and lower limit setter A5, for example, corresponds to a conversion function generator. The bankruptcy probability calculator A7, for example, corresponds to a model generator.

Processing conducted in each of units shown in FIG. 1 may be conducted in one computer device or may be conducted in a plurality of computer devices distributively. Furthermore, the processing conducted in each of units may be implemented by causing a CPU to execute a previously created program, using hardware, or using a combination of them.

The financial data reader A1 reads financial index values of enterprises in certain fiscal year from the financial database DB1.

FIG. 2 shows an example of financial data stored in the financial database DB1. Five financial indexes (attributes) 1 to 5 (gross profit ratio on sales, owned capital ratio, ordinary income, accounts receivable collection period, and sales increase ratio) are shown in FIG. 2. Each of values of the financial indexes 1 to 5 in one enterprise corresponds to an explanatory variable.

Specified financial index values (such as, for example, owned capital ratio, sales increase ratio, and ordinary income increase rate) of a specified enterprise group (for example, enterprises of the building industry) are read out from data having a form shown in FIG. 2, and stored in the financial data storage A2. The financial data storage A2 may be a memory such as a DRAM (Dynamic Random Access Memory). If the data amount is large, the financial data storage A2 may be a hard disk.

The bankruptcy information reader A3 reads bankruptcy information of enterprises from the bankruptcy information database DB2, and stores it in the bankruptcy information storage A4. The bankruptcy information contains information as to whether bankruptcy has occurred a year or less after a predetermined reference day (such as account day of the enterprise). The bankruptcy information storage A4 may be a memory such as a DRAM. If the data amount is large, the bankruptcy information storage A4 may be a hard disk.

Figures 3, 4:
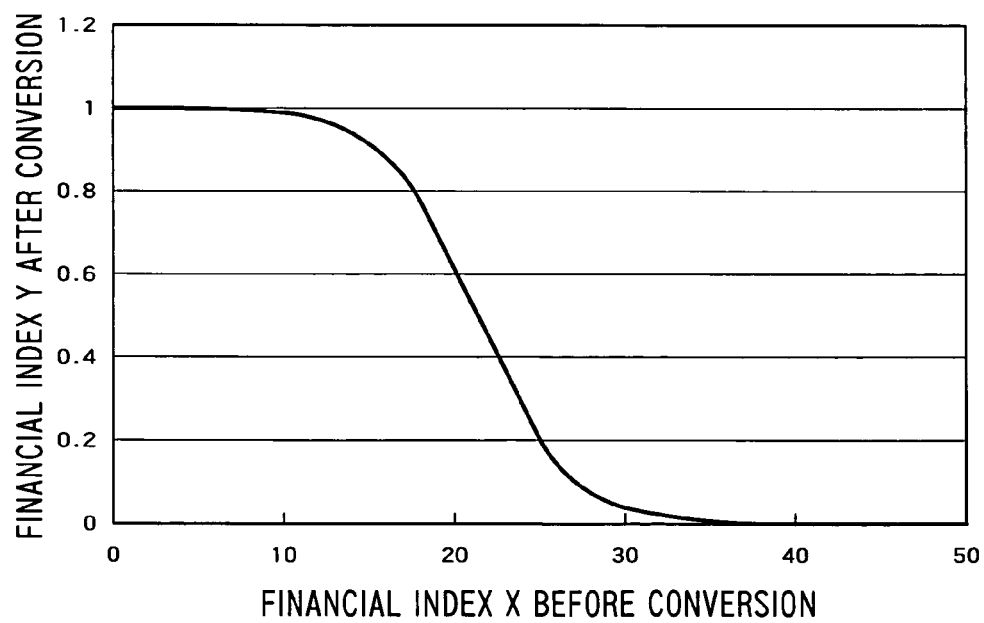
FIG. 3 is a diagram showing an example of bankruptcy information of enterprises.
FIG. 4 is a diagram showing an example of a graph of a logistic function.

FIG. 3 shows an example of bankruptcy information of enterprises stored in the bankruptcy information database DB2.

"1" in the bankruptcy information represents that the enterprise has gone bankrupt a year or less after, whereas "0" in the bankruptcy information represents that the enterprise has not gone bankrupt a year or less after. Bankruptcy information corresponds to, for example, a target variable, and "bankruptcy" corresponds to, for example, a predetermined event. A set of explanatory variables and a target variable corresponds to, for example, a sample. In the present embodiment, the bankruptcy information database DB2 and the financial database DB1 are provided separately. Data in these databases DB1 and DB2 may be stored in one database, and the present invention incorporates this case.

The upper and lower limit setter A5 receives financial index values from the financial data storage A2 and bankruptcy information from the bankruptcy information storage A4, and converts financial index values as described hereafter.

A value obtained by converting an ith financial index value $X_{ij}$ of a jth enterprise is denoted by $Y_{ij}$. Y corresponds to, for example, an intermediate variable. When converting a financial index value by using the logit conversion, the conversion is represented by (Expression 1), where $\alpha$ and $\beta$ are parameters in the conversion.

$$Y_{ij} = \frac{1}{1 + \exp(\alpha_i X_{ij} + \beta_i)} \quad \text{(Expression 1)}$$

Since the logistic function gradually approaches 0 or 1, this conversion is equivalent to setting upper and lower limit values of the financial index value. An example of a graph of the logistic function is shown in FIG. 4. As for the conversion parameters $\alpha$ and $\beta$, learning is conducted to maximize the logarithmic likelihood:

$$l(\alpha_i, \beta_i) = \log \prod_{j=1}^{N} Y_{ij}^{c_j}(1 - Y_{ij})^{(1-c_j)} \quad \text{(Expression 2)}$$

$$= \sum_{j=1}^{N} (c_j \log Y_{ij} + (1-c_j)\log(1-Y_{ij}))$$

In the case of the logistic function, optimization of the logarithmic likelihood is the so-called convex problem. Therefore, the optimization of the logarithmic likelihood can be conducted by using a well-known technique such as the Newton method or the steepest descent method.

In (Expression 2), N represents the number of enterprises stored in the financial data storage A2, and $c_j$ is a random variable. If the jth enterprise will go bankrupt within one year, the random variable $c_j$ assumes 1. If the jth enterprise will not go bankrupt within one year, the random variable $c_j$ assumes 0.

The upper and lower limit setter A5 stores the financial index value Y after conversion in the post-conversion index value storage A6. The post-conversion index value storage A6 may be a memory such as a DRAM. If the data amount is large, the post-conversion index value storage A6 may be a hard disk. An example of conversion of financial index values 1 (gross profit ratios on sales) in FIG. 2 conducted by using the (Expression 1) is shown in FIG. 5. Financial index values of enterprises before the conversion are converted into a range of 0 to 1.

The bankruptcy probability calculator A7 receives the financial index value Y after conversion from the post-conversion index value storage A6, and calculates a bankruptcy probability of an enterprise by using a logit model (a binary logit model based on linear combination of financial indexes after the conversion) represented by (Expression 3).

$$P_j = \frac{1}{1 + \exp\left(\sum_{i=1}^{M} \gamma_i Y_{ij} + \delta\right)} \quad \text{(Expression 3)}$$

Here, $P_j$ is a bankruptcy probability of the jth enterprise, and M is a total number of financial indexes used to calculate the bankruptcy probability. As for conversion parameters γ and δ, learning is conducted to maximize the logarithmic likelihood $$l(\gamma, \delta) = \log \prod_{j=1}^{N} P_j^{c_j}(1-c_j) \quad \text{(Expression 4)}$$

$$= \sum_{j=1}^{N} (c_j \log P_j + (1-c_j)\log(1-P_j))$$

by using the Newton method or the like. Thus, in the present embodiment, after the parameters of the financial index value conversion are learned, parameters of a logit model are learned.

The bankruptcy probability calculator A7 stores the calculated bankruptcy probability P in the bankruptcy probability storage A8. The bankruptcy probability storage A8 may be a memory such as a DRAM. If the data amount is large, the bankruptcy probability storage A8 may be a hard disk. FIG. 6 shows bankruptcy probabilities of the enterprises calculated using the (Expression 1) and (Expression 3) on the basis of the data shown in FIG. 2 and FIG. 3.

It is thus possible to calculate a probability that an enterprise to be evaluated will go bankrupt within a year on the basis of financial index values of the enterprise by using the (Expression 1) with the parameters α and β determined and the (Expression 3) with the parameters γ and δ determined.

In more detail, financial index values of a certain enterprise are input from an input unit which is not illustrated. Input financial indexes may be the same as those used when determining the parameters α and β. The upper and lower limit setter A5 receives the financial index values input from the input unit into X in the (Expression 1), converts the financial index values, and then stores the financial index values after conversion in the post-conversion index value storage A6. The bankruptcy probability calculator A7 reads out the financial index values after conversion from the post-conversion index value storage A6, inputs the financial index values read out into Y in the (Expression 3), and calculates a probability that the enterprise will go bankrupt within one year. The bankruptcy probability calculator A7 stores the calculated bankruptcy probability in the bankruptcy probability storage A8.

Heretofore, the (Expression 1) has been used as the logit conversion Expression of the financial index values. Alternatively, a conversion Expression obtained by adding a quadratic term and a logarithmic term to the (Expression 1) may be used. As an example, (Expression 5) is obtained by adding a quadratic term to the (Expression 1).

$$Y_{ij} = \frac{1}{1 + \exp(\alpha_i X_{ij} + \alpha_i X_{ij}^2 + \beta_i)} \quad \text{(Expression 5)}$$

A financial index which is not linear in relation between its financial index value and bankruptcy probability can also be modeled by thus adding the quadratic term and the logarithmic term.

Figure 15:
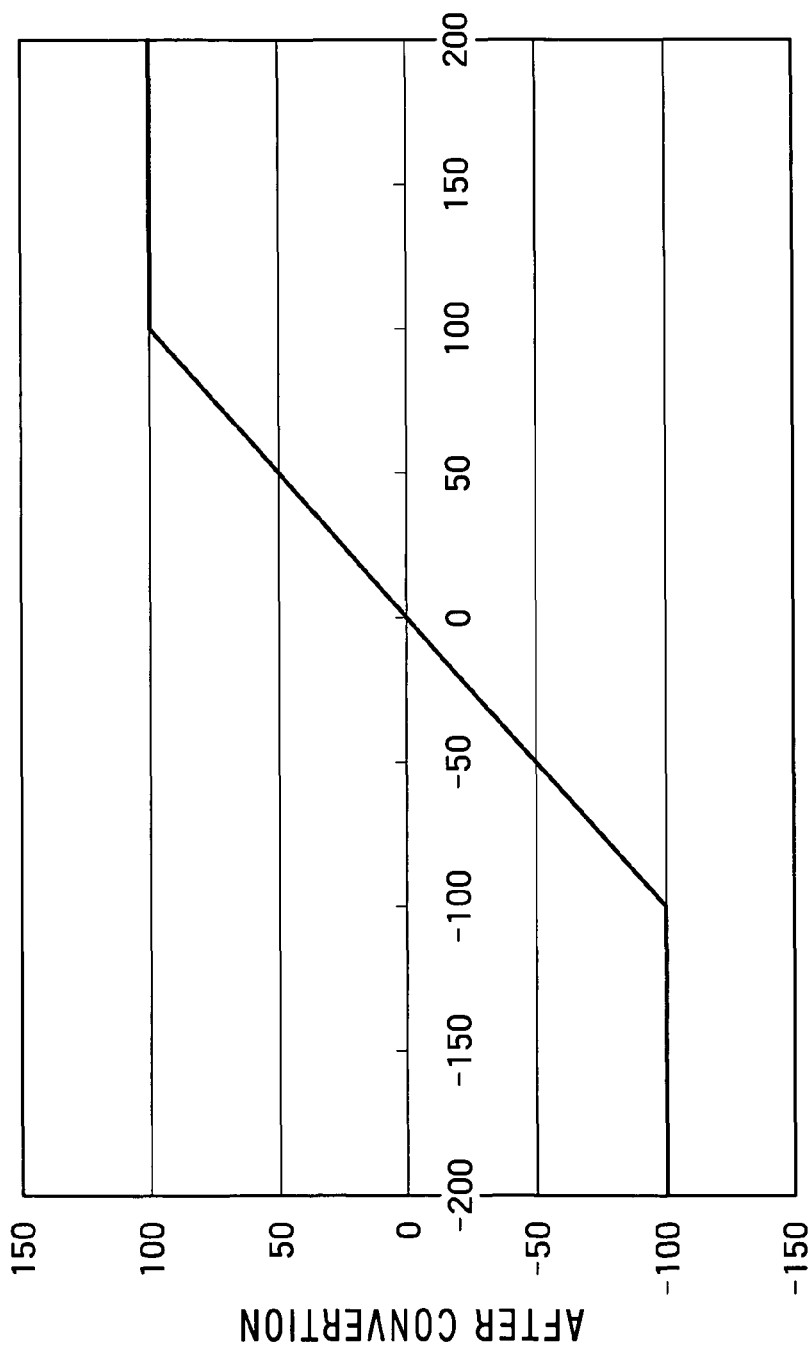
FIG. 15 is a diagram showing an example determining by an expert upper and lower limit values of a financial index value.

Conventionally, the upper and lower limit value of a financial index values are determined by an expert having expert knowledge concerning financial statements and actual operation as shown in FIG. 15. In this example, financial index values of at least 100 are converted to 100 and financial index values of −100 or less are converted to −100. "100" and "−100" in these original financial index values correspond to the upper limit and the lower limit, respectively. Conventionally, expert knowledge is needed to set the upper and lower limit values, and the upper and lower limit values cannot be determined simply.

On the other hand, in the present embodiment, parameters of the logistic function for converting a financial index value are learned, and parameters of a probabilistic model for calculating the bankruptcy probability of an enterprise from the financial index value after conversion are learned. It can be said that learning of parameters of the logistic function is substantially equivalent to setting the upper and lower limit values. In the present embodiment, the upper and lower limit values can be thus set automatically and a probabilistic model having high precision can be generated simply.

Second Embodiment

In the first embodiment, parameters of the financial index value conversion and the parameters of the logit model are learned separately. According to a feature of the second embodiment, however, parameters of the financial index value conversion and the parameters of the logit model are learned at a time. Hereafter, the present embodiment will be described in detail.

Figure 7:
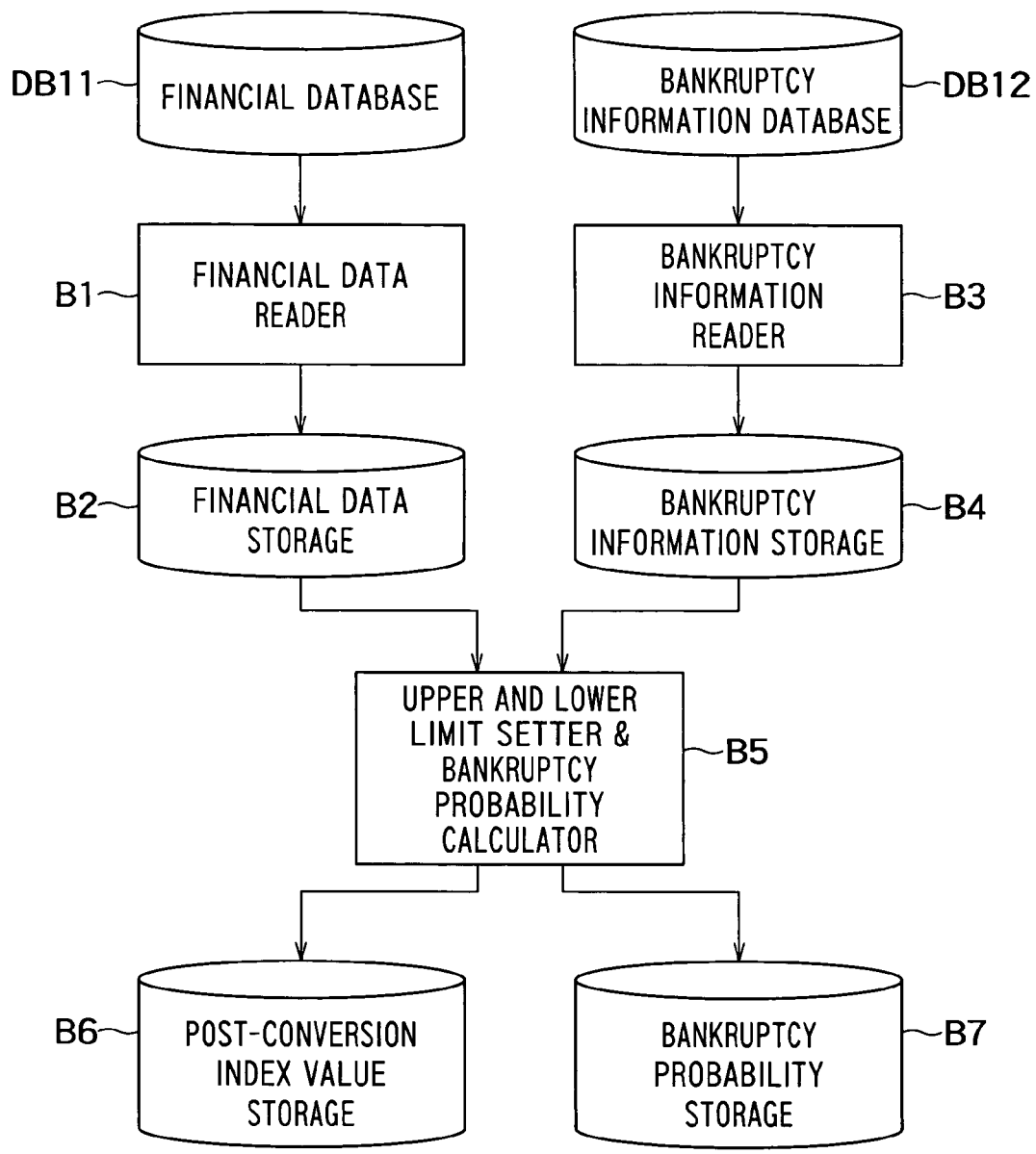
FIG. 7 is a block diagram showing schematically a probabilistic model generation apparatus according to a second embodiment.

FIG. 7 is a block diagram showing schematically a probabilistic model generation apparatus according to the second embodiment of the present invention.

The probabilistic model generation apparatus includes a financial database DB11, a bankruptcy information database DB12, a financial data reader B1, a financial data storage B2, a bankruptcy information reader B3, a bankruptcy information storage B4, a financial index value upper and lower limit setter & bankruptcy probability calculator B5 (hereinafter simply referred to as upper and lower limit setter & bankruptcy probability calculator), a post-conversion index value storage B6, and a bankruptcy probability storage B7.

The financial data reader B1 reads financial data of enterprises in certain fiscal year from the financial database DB11. The financial data reader B1 reads specified financial index values (such as, for example, owned capital ratio, sales increase ratio, and ordinary income increase rate) of a specified enterprise group (for example, enterprises of the building industry) from data having a form shown in FIG. 2, and stores the specified financial index values in the financial data storage B2. The financial data storage B2 may be a memory such as a DRAM. If the data amount is large, the financial data storage B2 may be a hard disk.

The bankruptcy information reader B3 reads bankruptcy information of enterprises (whether the enterprises went bankrupt one year or less after) as shown in FIG. 3 from the bankruptcy information database DB12, and stores it in the bankruptcy information storage B4. The bankruptcy information storage B4 may be a memory such as a DRAM. If the data amount is large, the bankruptcy information storage B4 may be a hard disk.

The upper and lower limit setter & bankruptcy probability calculator B5 receives financial index values from the financial data storage B2 and bankruptcy information from the bankruptcy information storage B4, converts financial index values, and calculates the bankruptcy probability as described in detail hereafter.

A value obtained by converting an ith financial index value $X_{ij}$ of a jth enterprise is denoted by $Y_{ij}$. When converting a financial index value by using the logit conversion, the conversion is represented by (Expression 6), where $\alpha$ and $\beta$ are parameters in the conversion.

$$Y_{ij} = \frac{1}{1 + \exp(\alpha_i X_{ij} + \beta_i)} \quad \text{(Expression 6)}$$

Since the logistic function gradually approaches 0 or 1, this conversion is equivalent to setting upper and lower limit values of the financial index value. A bankruptcy probability of an enterprise is calculated by using a logit model represented by (Expression 7). $P_j$ is a bankruptcy probability of the jth enterprise, and M is a total number of financial indexes used to calculate the bankruptcy probability.

$$P_j = \frac{1}{1 + \exp\left(\sum_{i=1}^{M} \gamma_i Y_{ij} + \delta\right)} \quad \text{(Expression 7)}$$

Figure 8:
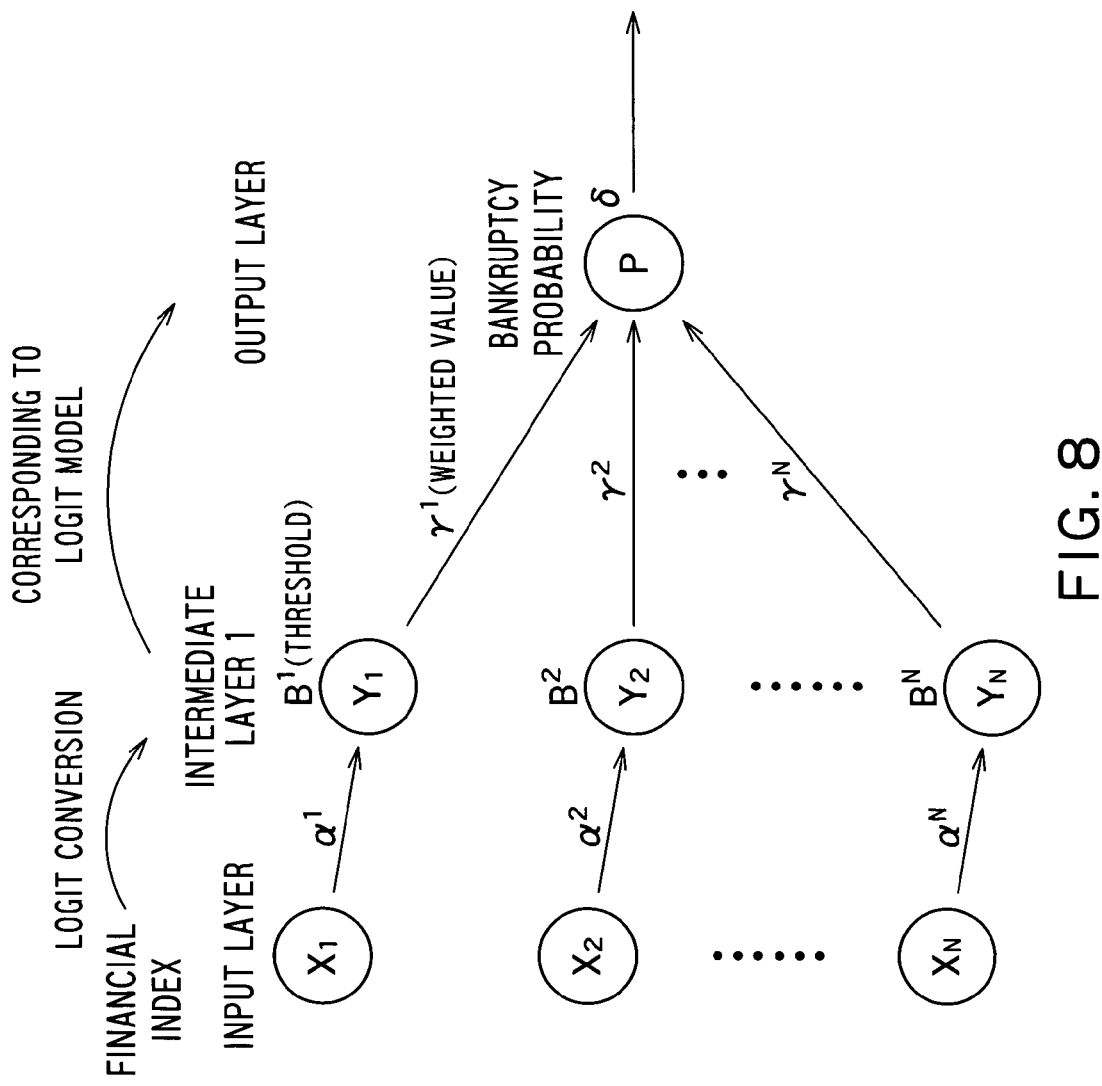
FIG. 8 is a diagram showing an example of a network structure.

As for conversion parameters $\alpha$, $\beta$, $\gamma$ and $\delta$ in the (Expression 6) and (Expression 7), learning is conducted to maximize the logarithmic likelihood $$l(\alpha, \beta, \gamma, \delta) = \log \prod_{j=1}^{N} P_j^{(1-c_j)} \quad \text{(Expression 8)}$$

$$= \sum_{j=1}^{N} (c_j \log P_j + (1 - c_j)\log(1 - P_j))$$

by using the Newton method or the like. Or the parameters may be learned so as to maximize the logarithmic likelihood by utilizing a network having a structure shown in FIG. 8 (which can be said to be a special neural network in that an intermediate node is not connected to all input nodes). In (Expression 8), N represents the number of enterprises stored in the financial data storage B2 and $c_j$ is a random variable. If the jth enterprise goes bankrupt within one year, the random variable $c_j$ assumes 1. If the jth enterprise does not go bankrupt within one year, the random variable $c_j$ assumes 0.

The financial index value Y after conversion is stored in the post-conversion index value storage B6. The post-conversion index value storage B6 may be a memory such as a DRAM. If the data amount is large, the post-conversion index value storage B6 may be a hard disk.

On the other hand, the calculated bankruptcy probability P is stored in the bankruptcy probability storage B7. The bankruptcy probability storage B7 may be a memory such as a DRAM. If the data amount is large, the bankruptcy probability storage B7 may be a hard disk.

As heretofore described, it is possible to calculate a probability that an enterprise to be evaluated will go bankrupt within a year on the basis of financial index values of the enterprise by using the (Expression 6) with the parameters $\alpha$ and $\beta$ determined and the (Expression 7) with the parameters $\gamma$ and $\delta$ determined.

In more detail, financial index values of a certain enterprise are input from an input unit which is not illustrated. Input financial indexes may be the same as those used when determining the parameters $\alpha$, $\beta$, $\gamma$ and $\delta$. The upper and lower limit setter & bankruptcy probability calculator B5 receives the financial index values input from the input unit into X in the (Expression 6), converts the financial index values, and then stores the financial index values after conversion in the post-conversion index value storage B6. The upper and lower limit setter & bankruptcy probability calculator B5 reads out the financial index values after conversion from the post-conversion index value storage B6, inputs the financial index values read out into Y in the (Expression 7), and calculates a probability that the enterprise will go bankrupt within one year. The upper and lower limit setter & bankruptcy probability calculator B5 stores the calculated bankruptcy probability in the bankruptcy probability storage B7.

According to the present embodiment, the parameters of the financial index value conversion and the parameters of the logit model are learned at a time, as heretofore described. As a result, the total time required for parameter calculation can be shortened.

Third Embodiment

In the present embodiment, a broken line function is adopted as the function for converting the financial index values. Hereafter, the present embodiment will be described with reference to FIG. 1.

The financial data reader A1 reads specified financial index values (such as, for example, owned capital ratio, sales increase ratio, and ordinary income increase rate) of a specified enterprise group (for example, enterprises of the building industry) from the financial database DB1 which stores financial data of enterprises in certain fiscal year, and stores the read financial index values in the financial data storage A2.

The bankruptcy information reader A3 reads bankruptcy information of enterprises (whether the enterprises went bankrupt one year or less after) from the bankruptcy information database DB2, and stores it in the bankruptcy information storage A4.

The upper and lower limit setter A5 receives financial index values from the financial data storage A2 and bankruptcy information from the bankruptcy information storage A4, and converts the financial index values. Here, a value obtained by converting an ith financial index value $X_{ij}$ of a jth enterprise is denoted by $Y_{ij}$. In the present embodiment, the financial index values are converted by using a broken line function. For example, the following method is used.

It is now supposed that $\{b_1, \ldots, b_{K+1}\}$ are section boundary points of the financial index $X_i$ (where $b_1$ and $b_{K+1}$ are minimum and maximum values of the financial index $X_i$, respectively), and $\{q_1, \ldots, q_K\}$ are bankruptcy probabilities corresponding to respective sections. In other words, $q_k$=(The number of bankrupt enterprises corresponding to a section k)/(the number of all enterprises corresponding to the section k) (Expression 9)

Furthermore, $\{m_1, \ldots, m_K\}$ are middle points in respective sections (in other words, $m_t = (b_t + b_{t+1})/2$, t=1, ..., K). A value $Y_{ij}$ obtained by conversion of the financial index value $X_{ij}$ is defined by the following (Expression 10).

$$\begin{cases} q_1, & b_1 \leq X_{ij} \leq m_1 \\ \frac{q_{t+1} - q_t}{m_{t+1} - m_t}(x - m_t) + q_t, & m_t \leq X_{ij} \leq m_{t+1}, \\ & 1 \leq t \leq K - 1 \\ q_K, & m_K \leq X_{ij} \leq b_{K+1} \end{cases}$$ (Expression 10)

Figure 9:
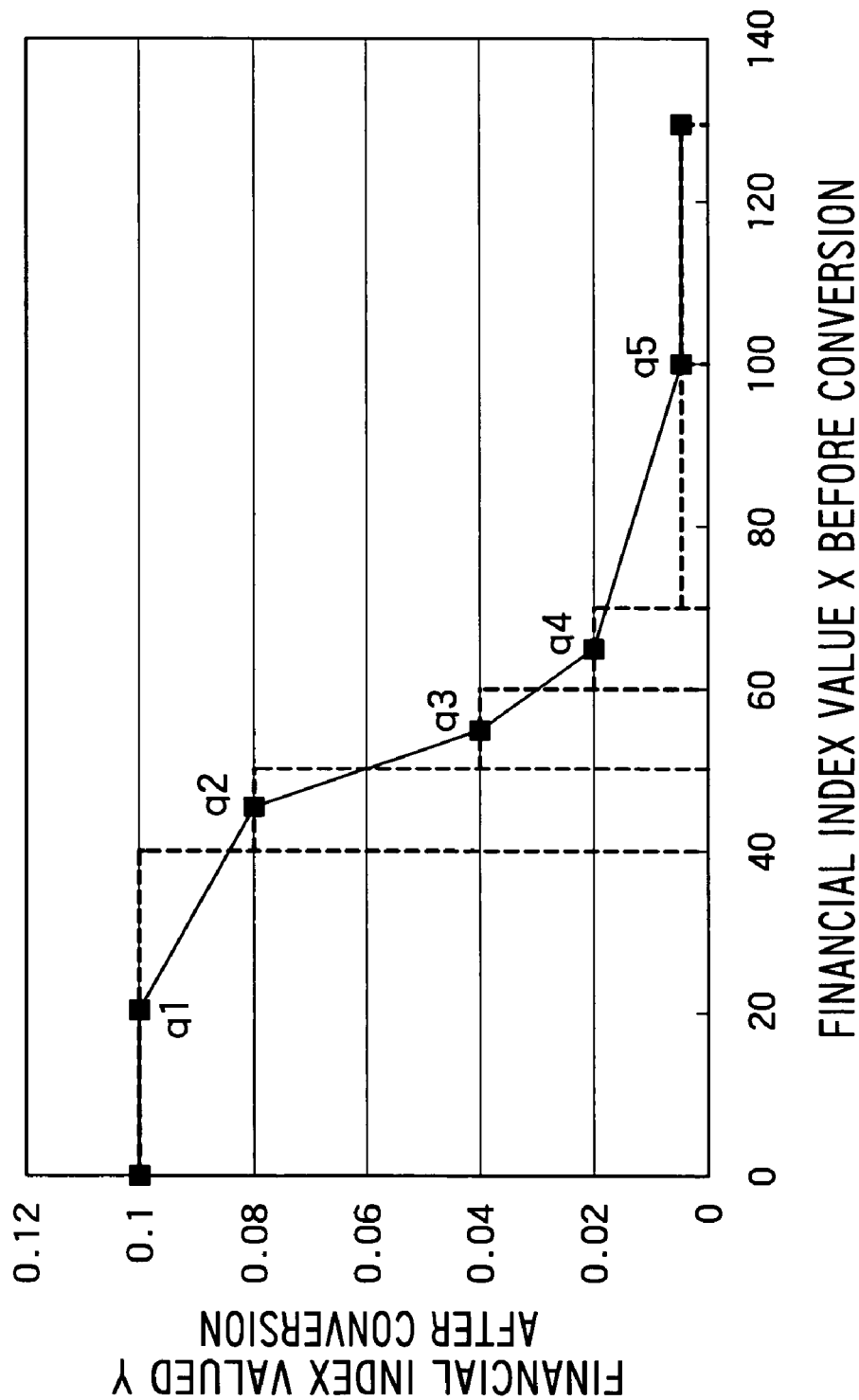
FIG. 9 is a diagram showing a graph example of a broken line function used to convert financial index values.

This conversion corresponds to conversion using a broken line function. FIG. 9 shows a graph example of a broken line function. This example corresponds to setting the upper and lower limit values respectively to 20 and 100 in the financial index before conversion.

Here, section boundary points $\{b_2, \ldots, b_K\}$ are found so as to maximize logarithmic likelihood $l(b_2, \ldots, b_K)$ defined by the following (Expression 11) by using the financial index values and the bankruptcy information as learning data. For example, values of respective elements are found so as to maximize the logarithmic likelihood with respect to each of $\{b_2, b_3\}$, $\{b_2, b_3, b_4\}$, $\{b_2, b_3, b_4, b_5\}$, ....

$$l(b_2, \ldots, b_K) = \log \prod_{j=1}^{N} Y_{ij}^{c_j}(1 - Y_{ij})^{(1-c_j)}$$ (Expression 11)

$$= \sum_{j=1}^{N}(c_j \log Y_{ij} + (1 - c_j)\log(1 - Y_{ij}))$$

Here, N represents the number of enterprises stored in the financial data storage A2, and $c_j$ is a random variable. If the jth enterprise goes bankrupt within one year, the random variable $c_j$ assumes 1. If the jth enterprise does not go bankrupt within one year, the random variable $c_j$ assumes 0.

As for a method for determining the number K of sections, there is, for example, a method of utilizing the financial index value and the bankruptcy information in a different fiscal year as test data and adopting the number K of sections which maximizes the logarithmic likelihood $$l'(b_2, \ldots, b_K) = \log \prod_{j=1}^{N'} Y'^{c'_j}_{ij}(1 - Y'_{ij})^{(1-c'_j)}$$ (Expression 12)

$$= \sum_{j=1}^{N'}(c'_j \log Y'_{ij} + (1 - c'_j)\log(1 - Y'_{ij}))$$

for the test data. For example, with respect to each of $\{b_2, b_3\}$, $\{b_2, b_3, b_4\}$, $\{b_2, b_3, b_4, b_5\}$, ... found using the (Expression 11), logarithmic likelihood of test data is calculated using the (Expression 12), and the number of sections which maximizes the logarithmic likelihood of test data is selected out of them. Here, N' represents the number of enterprises in the different fiscal year utilized for the calculation, and $c'_j$ is a random variable. If the jth enterprise goes bankrupt within one year, the random variable $c'_j$ assumes 1. If the jth enterprise does not go bankrupt within one year, the random variable $c'_j$ assumes 0.

The upper and lower limit setter A5 stores the financial index value Y after conversion in the post-conversion index value storage A6.

The bankruptcy probability calculator A7 receives the financial index value Y after conversion from the post-conversion index value storage A6, and calculates a bankruptcy probability of an enterprise by using a logit model represented by (Expression 13).

$$P_j = \frac{1}{1 + \exp\left(\sum_{i=1}^{M} \gamma_i Y_{ij} + \delta\right)}$$ (Expression 13)

Here, $P_j$ is a bankruptcy probability of the jth enterprise, and M is a total number of financial indexes used to calculate the bankruptcy probability. As for conversion parameters $\gamma$ and $\delta$, learning is conducted to maximize the following logarithmic likelihood.

$$l(\gamma, \delta) = \log \prod_{j=1}^{N} P_j^{c_j}(1 - P_j)^{(1-c_j)}$$ (Expression 14)

$$= \sum_{j=1}^{N}(c_j \log P_j + (1 - c_j)\log(1 - P_j))$$

The bankruptcy probability calculator A7 stores the calculated bankruptcy probability P in the bankruptcy probability storage A8.

According to the present embodiment, parameters of the broken line function for converting the financial index value are learned and parameters of a probabilistic model for calculating the bankruptcy probability of the enterprise from the financial index value after conversion are learned, as heretofore described. It can be said that the learning of the parameters of the broken line function is equivalent to setting the upper and lower limit values. In the present embodiment, the upper and lower limit values can be thus set automatically and a probabilistic model having high precision can be generated simply.

Fourth Embodiment

In the present embodiment, it is attempted to evaluate the probability of occurrence of a loss accident in office work conducted at an operation branch of a bank.

First, office work is divided into unit office work (such as new passbook issue and remittance). Change of office work in banks to online has been promoted, and consequently it is possible to easily count times of occurrence of various kinds of business such as new passbook issue and remittance. If standard time is previously set for each business to represent necessary time, therefore, a business amount in each business can be calculated from a product of the standard time and the number of times. As appreciated from the calculation method, the business amount is represented by a time period. Here, the business amount is handled on the second time scale. With respect to certain business, the business amount thus calculated is divided into unit businesses having equal lengths beforehand and the length of the unit business is made sufficiently short. In the present embodiment, the length of the unit business is set equal to 3,600 seconds. At this time, occurrence of loss accidents twice in one unit business is rare and consequently it is supposed that such a case is disregarded. Therefore, the number of loss accident times in the unit business becomes 0 or 1. Supposing that the business amount of certain business in a bank per month is 100 hours, 100 unit businesses exist. In certain business, each of individual unit businesses is identified by j. If an accident has occurred within the unit business, then $c_j=1$. If an accident has not occurred within the unit business, then $c_j=0$. Explanatory variables are supposed to be indexes shown in FIG. 10. The explanatory variables is represented as vector $x_j=(x_{1j}, \ldots, x_{16j})$.

With respect to certain business executed in the same operation branch, all indexes of vector $x_j$ in each unit business are supposed to be equal. Furthermore, as for the vector $x_j$, index values obtained half a year before are used. In other words, as shown in FIG. 11, a model is constructed to estimate the loss accident occurrence probability half a year hence on the basis of the vector $z_j$ (here, for convenience, $z_j$ is used instead of $x_j$) and data of $c_j$ half a year after a year of the $z_j$.

For example, if the number of unit businesses in an operation branch A is 100 and two loss accidents have occurred, then data shown in FIG. 12 are obtained with respect to the operation branch A (all of Za are the same vectors).

In the same way, data are generated with respect to other operation branches as well, and data concerning all operation branches are put together as shown in FIG. 13. By using the data, a model having high precision is generated simply in the same way as the first to third embodiments.

Fifth Embodiment

As for a mistake in hospital care, an instance in which a mistake is found before execution of care or an instance in which the patient has not been affected despite a mistake is called incident. On the other hand, an instance in which the patient is affected by a mistake, an instance in which the patient becomes dead or disabled, or an instance in which heavy treatment or remedy becomes needed is called accident. In the present embodiment, a model for calculating an accident occurrence probability is constructed for each nursing person.

Whether a nursing person causes an accident during a predetermined half year is represented by a variable c. In other words, if a nursing person j causes an accident, $c_j=1$. If a nursing person j does not cause an accident, $c_j=0$. Since the nursing person j scarcely causes accidents twice during a half year, c assumes 0 or 1 in the present embodiment as well. Furthermore, indexes shown in FIG. 14 are measured during the same half year.

These values are represented as vector $x_j=(x_{1j}, \ldots, x_{16j})$. The vector $x_j=(x_{1j}, \ldots, x_{16j})$ corresponds to the explanatory variables. Here, a model is generated for data of $\{(x_j, c_j)|j=1, \ldots, N\}$ in the same way as the first to third embodiments. N represents the number of nursing persons.

In the present embodiment, the vector $x_j$ and $c_j$ are data measured during the same time period. For estimating the probability of $c_j=1$, therefore, it is necessary to estimate a future vector $x_j$ and substitute this value into the model. The following use is also conceivable. If the probability of $c_j=1$ is high even though $c_j=0$, it is judged that a risk is not actualized although the risk is present, then a countermeasure is taken.

What is claimed is:

1. A bankruptcy probabilistic model generation apparatus including a computer readable storage medium containing a set of instructions that cause a computer processor to perform a data analyzing process for generating a bankruptcy probabilistic model calculating a probability that a bankruptcy or an accident occurs or does not occur, comprising:

a database storing financial data as a set of samples each of which includes a plurality of explanatory variables belonging to respectively different financial attributes and a target variable representing occurrence or nonoccurrence of a bankruptcy or an accident;

an upper and lower limit setter for each financial attribute, which optimizes a first objective function defined by using the variable belonging to the financial attribute in each sample, the target variable in each sample, and a first conversion parameter to find a value of the first conversion parameter, and calculates a first conversion function defined by the first conversion parameter and the variable belonging to the financial attribute to convert the variable to an intermediate variable with a certain range of value for each sample of the financial data, wherein the certain range of value has an upper limit, a lower limit or both an upper and lower limit; and a bankruptcy probability calculator, which optimizes a second objective function defined by using a plurality of intermediate variables corresponding to the plurality of variables in each sample of the financial data, the target variable in each sample of the bankruptcy data, and a second conversion parameter to find a value of the second conversion parameter, and calculates a second conversion function defined by the second conversion parameter and a plurality of intermediate variables belonging to the financial attributes to obtain a bankruptcy probability that the bankruptcy or accident occurs or does not occur for each sample of the financial data, wherein the first and second objective functions are logarithmic likelihood functions.

2. The apparatus according to claim 1, wherein:

the upper and lower limit setter or the bankruptcy probability calculator performs optimizing by maximizing the corresponding one of the logarithmic likelihood functions.

3. The apparatus according to claim 1, wherein the first conversion function is a logistic function.

4. The apparatus according to claim 3, wherein the logistic function has an nth-order term of a variable (where n is an integer of at least 2), or a logarithmic term of a variable.

5. The apparatus according to claim 1, wherein:
the first conversion function is a broken line function,
when a variable to be input into the broken line function is a first threshold or more, the broken line function outputs a first constant value as an intermediate variable, and
when a variable to be input into the broken line function is a second threshold or less, the broken line function outputs a second constant value as an intermediate variable.

6. The apparatus according to claim 1, wherein
the second conversion function is a binary logit model which has a linear combination of a plurality of intermediate variables.

7. A bankruptcy probabilistic model generation apparatus including a computer readable storage medium containing a set of instructions that cause a computer processor to perform a data analyzing process for generating a bankruptcy probabilistic model calculating a probability that a bankruptcy or an accident occurs or does not occur, comprising:
a database storing financial data as a set of samples each of which includes a plurality of explanatory variables belonging to respectively different financial attributes and a target variable representing occurrence or nonoccurrence of a bankruptcy or an accident;
an upper and lower limit setting and bankruptcy probability calculator which optimizes an objective function defined by using the plurality of variables in each sample, the target variable in each sample, a first conversion parameter provided for every financial attribute and a second conversion parameter, to find values of the first conversion parameters and a value of the second conversion parameter, calculates a first conversion function defined by the first conversion parameter and the variable belonging to the financial attribute to convert the variable to an intermediate variable with a certain range of value for each financial attribute in each sample of the financial data, wherein the certain range of value has an upper limit, a lower limit or both an upper limit and a lower limit, and calculates a second conversion function defined by the second conversion parameter and a plurality of intermediate variables belonging to the financial attributes to obtain a bankruptcy probability that the bankruptcy or accident occurs or does not occur for each sample of the financial data,
wherein the objective function is a logarithmic likelihood function.

8. The apparatus according to claim 7, wherein
the upper and lower limit setting and bankruptcy probability calculator performs optimizing by maximizing the logarithmic likelihood function.

9. The apparatus according to claim 7, wherein the first conversion function is a logistic function.

10. The apparatus according to claim 9, wherein the logistic function has an nth-order term of a variable (where n is an integer of at least 2), or a logarithmic term of a variable.

11. The apparatus according to claim 7, wherein:
the first conversion function is a broken line function,
when a variable to be input into the broken line function is a first threshold or more, the broken line function outputs a first constant value as an intermediate variable, and
when a variable to be input into the broken line function is a second threshold or less, the broken line function outputs a second constant value as an intermediate variable.

12. The apparatus according to claim 7, wherein the second conversion function is a binary logit model which has a linear combination of a plurality of intermediate variables.

13. A computer readable storage medium storing a computer program including instructions for causing a computer processor generating a bankruptcy probabilistic model calculating a probability that a bankruptcy or an accident occurs or does not occur, to perform steps comprising:
accessing a database storing financial data as a set of samples each of which includes a plurality of explanatory variables belonging to respectively different financial attributes and a target variable representing occurrence or nonoccurrence of a bankruptcy or an accident;
for every financial attribute, optimizing a first objective function defined by using the variable belonging to the financial attribute in each sample, the target variable in each sample, and a first conversion parameter to find a value of the first conversion parameter, and calculating a first conversion function defined by the first conversion parameter and the variable belonging to the financial attribute to convert the variable to an intermediate variable with certain range of value for each sample of the financial data, wherein the certain range of value has an upper limit, a lower limit or both an upper limit and a lower limit; and
optimizing a second objective function defined by using a plurality of intermediate variables corresponding to the plurality of variables in each sample of the financial data, the target variable in each sample of the bankruptcy data, and a second conversion parameter to find a value of the second conversion parameter, and calculating a second conversion function defined by the second conversion parameter and a plurality of intermediate variables belonging to the financial attributes to obtain a bankruptcy probability that the bankruptcy or accident occurs or does not occur for each sample of the financial data,
wherein the first and second objective functions are logarithmic likelihood functions.

* * * * *